US012656314B2

(12) United States Patent
De Andrade Rezende et al.

(10) Patent No.: US 12,656,314 B2
(45) Date of Patent: Jun. 16, 2026

(54) PORTABLE SYSTEM FOR DETERMINING MONOETHYLENE GLYCOL

(71) Applicants: PETRÓLEO BRASILEIRO S.A.—PETROBRAS, Rio de Janeiro (BR); UNIVERSIDADE FEDERAL DE GOIÁS—UFG, Goiânia (BR)

(72) Inventors: Kariolanda Cristina De Andrade Rezende, Goiânia (BR); Wendell Karlos Tomazelli Coltro, Goiânia (BR); Iris Medeiros Junior, Rio de Janeiro (BR)

(73) Assignees: PETRÓLEO BRASILEIRO S.A.—PETROBRAS, Rio de Janeiro (BR); UNIVERSIDADE FEDERAL DE GOIÁS—UFG, Goiânia—Go (BR)

( * ) Notice: Subject to any disclaimer, the term of this patent is extended or adjusted under 35 U.S.C. 154(b) by 0 days.

(21) Appl. No.: 17/406,419

(22) Filed: Aug. 19, 2021

(65) Prior Publication Data

US 2022/0057361 A1 Feb. 24, 2022

(30) Foreign Application Priority Data

Aug. 21, 2020 (BR) ...................... 10 2020 017177 1

(51) Int. Cl.
*G01N 27/49* (2006.01)
*G01N 27/30* (2006.01)

(52) U.S. Cl.
CPC ........... *G01N 27/49* (2013.01); *G01N 27/301* (2013.01)

(58) Field of Classification Search
CPC .. G01N 27/49; G01N 27/301; G01N 33/2823; G01N 33/2852; G01N 27/406; G01N 33/2835
See application file for complete search history.

(56) References Cited

U.S. PATENT DOCUMENTS

| | | | |
|---|---|---|---|
| 4,617,278 A | 10/1986 | Reed | |
| 5,192,416 A * | 3/1993 | Wang | ................. G01N 27/3271 |
| | | | 204/409 |

FOREIGN PATENT DOCUMENTS

| | | | |
|---|---|---|---|
| BR | 102014021474 A2 * | 9/2016 | |
| BR | 102014032785-1 A2 | 7/2017 | |
| BR | 102017023542 A2 * | 6/2019 | |
| RU | 2583878 C2 * | 5/2016 | |
| WO | WO-2010106099 A1 * | 9/2010 | ............. G01N 27/49 |

OTHER PUBLICATIONS

Maruta et al., Flow injection analysis of free glycerol in biodiesel using a copper electrode as an amperometric detector, Fuel, 2012, 91, 187-191 (Year: 2012).*

(Continued)

*Primary Examiner* — Shizhi Qian

(74) *Attorney, Agent, or Firm* — Birch, Stewart, Kolasch & Birch, LLP

(57) ABSTRACT

A portable system includes an electrochemical cell for batch injection analysis (BIA) coupled to a copper oxide electrode for the selective determination and quantification of mono-ethylene glycol (MEG) from different petrochemical samples with application in the environment laboratory and in field analyses, aiming at the quality control of these samples by portable methodology and in a short analysis time.

6 Claims, 7 Drawing Sheets

(56)          References Cited

OTHER PUBLICATIONS

Paixao et al., Design and characterization of a thin-layered dual-band electrochemical cell, Electrochimica Acta, 2003, 48, 691-698 (Year: 2003).*

Barragan et al., English translation of BR-102014021474-A2, 2016 (Year: 2016).*

Chelnokova et al., English translation of RU2583878C2, 2016. (Year: 2016).*

Garcia et al., Batch injection analysis towards auxiliary diagnosis of periodontal diseases based on indirect amperometric detection of salivary alpha-amylase on a cupric oxide electrode, Analytica Chimica Acta, 2018, 1041, 50-57 (Year: 2018).*

Garcia et al., Supplementary Material for Batch injection analysis towards auxiliary diagnosis of periodontal diseases based on indirect amperometric detection of salivary alpha-amylase on a cupric oxide electrode, Analytica Chimica Acta, 2018, 1041, 50-57 (Year: 2018).*

Katseli et al., Miniature 3D-printed integrated electrochemical cell for trace voltammetric Hg(II) determination, Sensors and Actuators B: Chemical, 2020, 308, 127715 (Year: 2020).*

Silva et al., Batch injection analysis with electrochemical detection for the simultaneous determination of the diuretics furosemide and hydrochlorothiazide in synthetic urine and pharmaceutical samples, Microchemical Journal, 2020, 157, 105027 (Year: 2020).*

Pereira et al., Fast batch injection analysis system for on-site determination of ethanol in gasohol and fuel ethanol, Talanta, 2012, 90, 99-102 (Year: 2012).*

Giordano et al., Turbulence-assisted high-throughput liquid-liquid extraction in microfluidics and Ni(OH)2 nanoparticles for electrochemical determination of monoethylene glycol traces in natural gas condensate, energy & fuels, 2018, 32, 6577-6583). (Year: 2018).*

Cunha et al., "Microemulsification-Based Method: Analysis of Monoethylene Glycol in Samples Related to Natural Gas Processing," Energy Fuels, vol. 29, Sep. 1, 2015, pp. 5649-5654.

Giordano, "Microemulsification-Based Method: Coupling with Separation Technique," Journal of Analytical & Bioanalytical Techniques, vol. 6, No. 5, 2015, pp. 1-7 (8 pages total).

* cited by examiner

PORTABLE SYSTEM FOR DETERMINING MONOETHYLENE GLYCOL

FIELD OF INVENTION

The present invention refers to a portable system for the selective determination and quantification of monoethylene glycol (MEG) from different petrochemical samples, with application in a laboratory environment and in field analyses, aiming at quality control by portable methodology and in a short time of analysis. The portable system consists of an electrochemical cell, for analysis by batch injection (BIA), coupled to a copper oxide electrode.

DESCRIPTION OF PRIOR ART

The oil extraction process takes place at high pressures and low temperatures, favoring formation of gas hydrates. These species, also called clarates, shows a crystalline structure comprised of hydrogen bonds between water molecules (host molecule) that surround natural gas molecules (guest molecule). The formation of these hydrates can occur both in the process of transporting the extracted organic matter and in the liquefied separation at low temperatures.

Due to its rigidity, similar to blocks of ice, the deposition of these hydrates can cause excessive pressure in the conduits, loss of production equipment, obstruction of pipes and even breaks in the production line. The addition of species that are unfavorable to the formation of gas hydrates is already widely used, and it can be distinguished from additives such as kinetic inhibitors, anti-caking agents and thermodynamic inhibitors.

The kinetic inhibitors are species, normally polymeric, that reduce the growth rate of hydrates, reducing their formation rate and not favoring the agglomeration of the crystals formed. Thus, hydrate crystals are formed in smaller amounts and reduced dimensions, minimizing industrial damage. The anti-caking agents are mostly surfactants that disperse the formed crystals and facilitate the transport thereof. Thermodynamic inhibitors, on the other hand, are considered the most efficient and reliable additives for the problem of hydrate formation since they prevent the formation of the crystalline structure by shifting the hydrate formation equilibrium curve to temperatures lower than those of the industrial process. The chemicals most used as thermodynamic inhibitors are small-chain alcohols, such as methanol, and diols. Due to its low environmental risk, monoethylene glycol (MEG) is the most used thermodynamic inhibitor.

MEG also has the advantage of being a hygroscopic soluble compound that absorbs twice its weight in water, so it can be extracted from the condensate and regenerated for reuse, reducing inhibitor consumption. However, the presence of this compound in the other refining steps is undesirable, allowing the poisoning of catalysts, corrosion of conduits and reduction in quality of the condensate.

Thus, methodologies for the determination and quantification of monoethylene glycol in final condensate samples are necessary to guarantee the quality of natural gas products. In the literature, the use of spectrophotometric methods for detecting glycol through previous oxidation of samples to aldehydes or carboxylic acids is observed. Chromatographic methods have also been reported, including for assays in biological samples such as blood and plasma. Qualitative analysis in electrochemical cells have already been used to oxidize monoethylene glycol solutions, having studies with different working electrodes. In the document by CHRISTENSEN, P. A.; HAMNETT, A. "The oxidation of ethylene glycol at a platinum electrode in acid and base: An in situ FTIR study", *Journal of Electroanalytical Chemistry and Interfacial Electrochemistry*, v. 260, n. 2, p. 347-359, 10 Mar. 1989, the oxidation of MEG with platinum electrodes was reported, evaluating the process in relation to the pH of the medium.

As it is a neutral compound, analyses for the determination of MEG by electrophoretic methods become unfeasible due to its low ionization. Even with the use of pre-treatments of the sample, such as acid or electrochemical oxidation, they demand pH conditions that impair sensitivity and increase the signal-to-noise ratio when using conductometric detection. Knowing this, we sought a methodology that would be effective in estimating the concentration of MEG through a single step, through the electro-oxidation of the compound.

Knowing that conventional electrochemical tests demand a significant sample volume, as well as an average analysis time, it was decided to use batch injection analysis (BIA) as an alternative to reduce sample volume and increase the analytical frequency.

The determination of monoethyleneglycol is normally done using classical titration methodologies. The use of redox titration demands a large amount of sample and reagents, generating a significant volume of waste. In addition, the methodology needs to be carried out in a laboratory environment, making field analysis difficult.

In the study by BELTRAME, M. B., GIORDANO, G. F., VIEIRA, L. S. S. et al., "Determinação eletroanalítica de monoetilenoglicol em amostras orgânicas de processamento de gás natural liquefeito", VI Workshop em microfluídica, 20 a 22 de julho de 2016, Campinas, São Paulo, Livro de Resumos, p. 65-66, reveals an electrochemical platform for the quantification of monoethyleneglycol (MEG) in samples of liquefied natural gas (GNL) processing, which uses electrochemical detection through cyclic voltammetry tests with a working electrode comprised of nickel. The study was carried out in a conventional electrochemical cell with three electrodes: nickel, platinum and Ag/AgCl as working, auxiliary and reference electrodes, respectively. It is observed that primary alcohols, such as ethanol, can interfere in the quantification of MEG, as described in the reference GIORDANO, G. F., VIEIRA, L. C. S, GOBBI, A. L. et al. "An integrated platform for gas-diffusion separation and electrochemical determination of ethanol on fermentation broths", *Analytica Chimica Acta*, v. 875, p. 33-40, May 2015. Ethanol is a compound that can be found in samples during processes in the petrochemical industry.

Document BR1020140327851A2 refers to the use of microemulsions based on turbidity measurements between phases of a ternary system as a thermodynamic method for quantitative analytical determination. This method uses organic solvents and does not describe selectivity for MEG analysis in the presence of interferents, in addition to demanding large volumes of reagents and samples.

U.S. Pat. No. 4,617,278 discloses a portable platform for determination of alcohol content with applications for petroleum products, especially for gasoline. The proposal in question covers colorimetric reactions in cylindrical tubes for the detection of ethanol and methanol. With regard to monoethyleneglycol, the methodology uses it as a reagent for colorimetric reactions, together with a violet color indicator. Thus, the methodology is effective for determining the content of primary alcohols, but it does not show the quantification of MEG. Furthermore, it demands large volumes of reagents and samples.

As can be seen, no prior art document discloses a portable system for selective determination of monoethylene glycol such as the one of the present invention.

In order to solve such problems, the present invention was developed, through which the portable system is applied for the selective determination and quantification of MEG from petrochemical samples, aiming at the quality control of these samples by portable methodology and in a short time of analysis.

The system of the invention offers advantages in terms of analytical frequency, required sample volume and, mainly, allows the analysis of MEG in the presence of other interferent in a selective fashion, adjusting the detection potential applied to the electrochemical cell.

The BIA cell coupled with electrochemical detection allows for the sequential injection of samples in a programmed and automatic way, resulting in faster analysis, without reducing analytical accuracy.

Another advantage of batch injection analyses is the reduction in waste generation, whether due to the low demand for sample volume (about 15 μL) or the volume of the cell itself. Considering the dimensions of the cell shown, the volume of support electrolyte used to fill it is of approximately 50 mL, which is enough for a day of continuous work.

With regards to portability, the cell is robust, enabling field analysis with fast and accurate results. The system can be operated via battery, ensuring autonomy for several hours of work.

BRIEF DESCRIPTION OF THE INVENTION

The present invention refers to a portable system comprised of an electrochemical cell for batch injection analysis (BIA) coupled to a copper oxide electrode for the selective determination of monoethylene glycol (MEG), under conditions that other alcohols present in condensate samples gas are not interferents.

The portable system can be used both in a laboratory environment and in field analyses, requiring only a potentiostat, a computer for data acquisition and a source of electrical power.

The invention can be applied in different matrices having MEG, only requiring extracting the analyte of interest in the basic medium that comprises the support electrolyte (preferably 0.5 mol/L NaOH).

BRIEF DESCRIPTION OF THE DRAWINGS

The present invention will be described in more detail below, with reference to the attached figures which, in a schematic and non-limiting way, represent examples of the configuration thereof. In the drawings, there are.

DETAILED DESCRIPTION OF THE INVENTION

Figure 1:
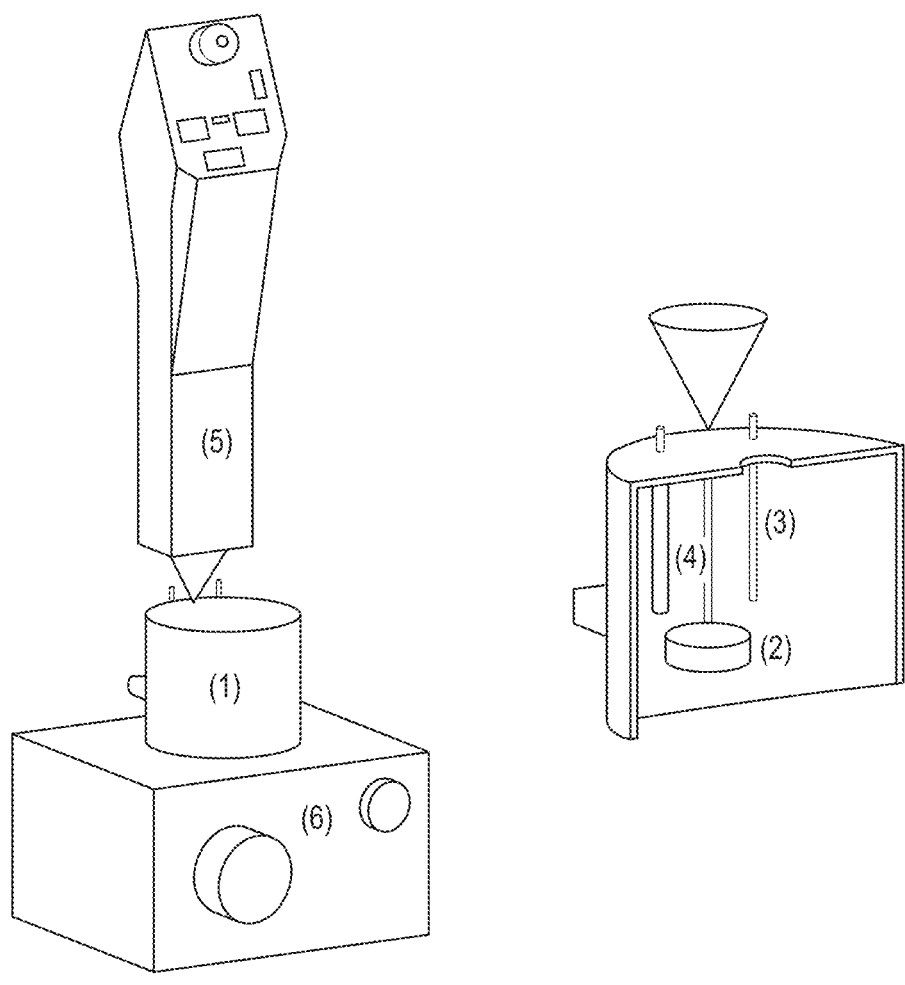
FIG. 1 illustrating the elements of BIA cell (1) of present invention comprising a working electrode (2), an auxiliary electrode (3) and a reference electrode (4), and having an electronic micropipette coupling (5) and a stirring system (6)

The portable system according to the present invention, and illustrated in FIG. 1, comprises an electrochemical cell for batch injection (BIA) analysis made of polymeric material. The BIA cell (1) is comprised of a working electrode (2) of copper oxide, an auxiliary electrode (3) of stainless steel and a reference electrode (4) of Ag/AgCl$_{sat}$.

The invention can be applied in different matrices having MEG, requiring only to extract the analyte of interest in the basic medium, preferably 0.5 mol/L NaOH, which makes up the support electrolyte. In addition, the method allows for analyses with a MEG detection limit of 0.23 mol/L.

The BIA cell (1) uses a copper oxide working electrode (2) that presents an analytical response with a voltage range of 0.35 and 0.55 V. The voltage of 0.45 V is preferably used to discriminate the monoethylene glycol of the main alcohols present in the condensate samples, thus reducing interferents.

The portable system uses a potentiostat (not shown in FIG. 1) coupled for amperometric analysis by batch injection. In this type of analysis, the electrodes are immersed in a basic solution, preferably 0.5 mol/L NaOH (supporting electrolyte), under agitation, in which volumes in the range of 2 μL to 20 μL (preferably 15 μL) of sample are injected directly under the working electrode (2). The sample is introduced by means of an electronic micropipette (5) with flow rate and injected volume controlled, and the agitation is done by a magnetic stirrer (6).

The analytical response is given by peak whose intensity is directly proportional to the concentration of MEG in the sample. Regarding batch analyses, it is possible to use the cell for the whole day of analysis performing successive tests with less than 100 mL of waste generation.

The electro-oxidation of the species was carried out in a uStat400 potentiostat/galvanostat (DropSens S.L., Oviedo, Spain) and monitored by a software DropView®. Injections were performed with the aid of an electronic micropipette (5) (Multipette® stream—Eppendorf) with 100 μL Combitip®.

The BIA cell (1) used, but not limited to these types of electrodes, is comprised of a working electrode (2) of copper oxide, an auxiliary electrode (3) of stainless steel and, as a reference electrode (4) of Ag/AgCl$_{sat}$. The distance from Combitip® to the working electrode (2) was approximately 2 mm. The cell structure was printed by a Prusa Movitech® 3D printer using polylactic acid (PLA) as substrate. The cell shows, preferably, cylindrical dimensions of approximately 5.0 cm in height and diameter, and its configurations are designed with the help of software AutoCAD®, and can be manufactured with different materials and with other dimensions.

EXAMPLES

For this study, tests were carried out as follows, which represent embodiment examples of present invention.

Example 1: Monoethylene Glycol Oxidation Test

The electro-oxidation process was studied, using the cyclic voltammetry technique, with the aim at evaluating the BIA cell (1) and observing at which voltages the MEG would be oxidized.

Figure 2:
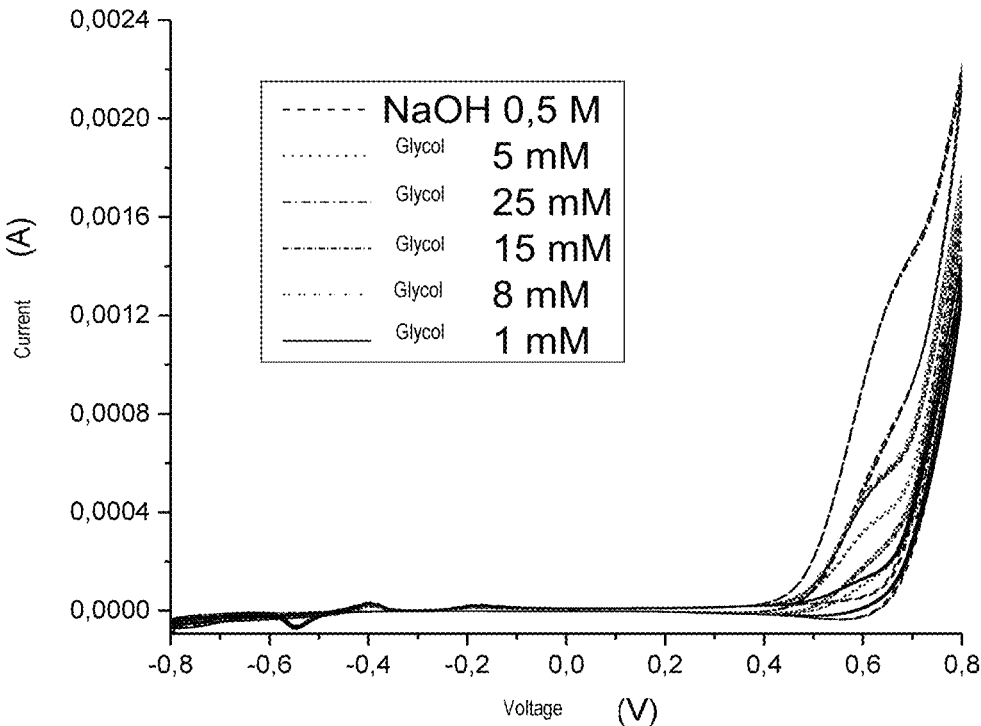
FIG. 2 illustrating the cyclic voltammograms of monoethylene glycol samples diluted in 0.5 mol/L NaOH and scanning from −800 to 800 V at a speed of 20 mV/s.

The tests were performed with 0.5 mol/L NaOH and it can be seen in the voltammograms obtained in FIG. 2 that, from 0.35 V to 0.8 V, the oxidation of monoethylene glycol occurs. From 0.6 V onwards, there are also signs of oxygen evolution, as observed in the electrolyte analysis.

Thus, aiming at analyses with greater sensitivity and without harming the stability of the electrode, 0.5 mol/L NaOH was preferentially chosen as the electrolyte for the next steps.

Example 2: Optimization Test of Electronic Micropipette Parameters

Figure 3:
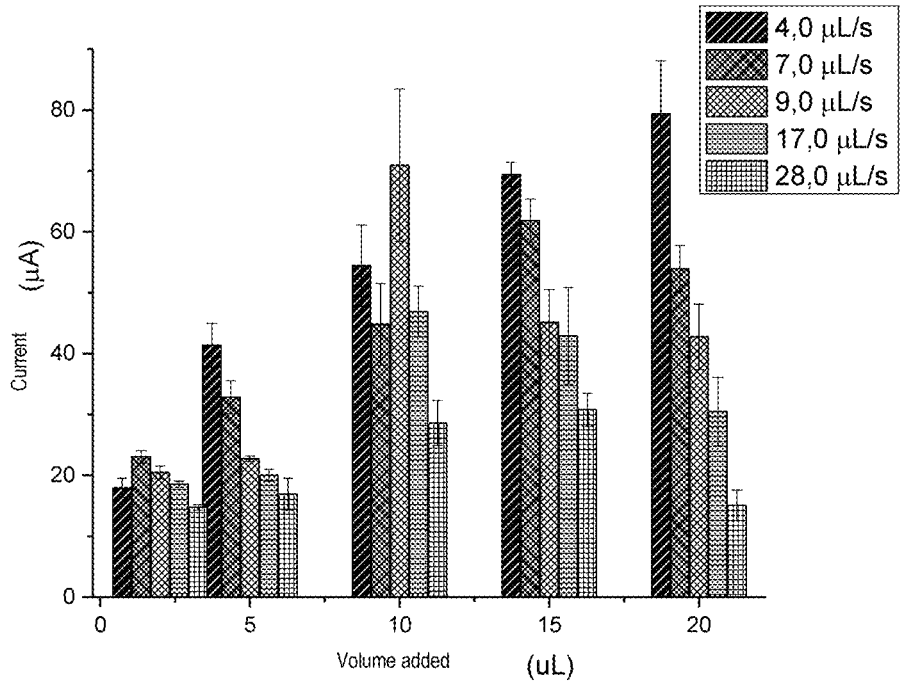
FIG. 3 illustrating the optimization of micropipette instrumental parameters for the use in BIA analyses.

In batch injection analyses, factors such as sample volume and flow velocity interfere with the current obtained. In general, this current obtained is directly proportional to the injected sample volume. Tests were carried out to optimize these parameters with a standard solution of 25 mmol/L MEG in 0.5 mol/L NaOH. As shown in FIG. 3, it is noted that volumes below 5.0 µL result in relatively low currents, increasing the detection limit. Regarding larger volumes, there was no significant difference between the volumes of 10, 15 and 20 µL, which resulted in a greater current signal. In this way, all these volumes can be used, being recommended the volume of 15 µL as it shows the smallest standard deviation among the replicates.

Among the five injection rates analyzed, a response was obtained for values between 4.0 and 28.0 µL/s. It was noticed that the current obtained is inversely proportional to the flow. It is recommended, preferably, a flow of 4.0 µL/s.

Example 3: Stirring System Test

Analyzes in BIA cells (1) can be performed with or without a stirring system (6), and these parameters are evaluated according to analytical frequency and repeatability.

Figure 4:
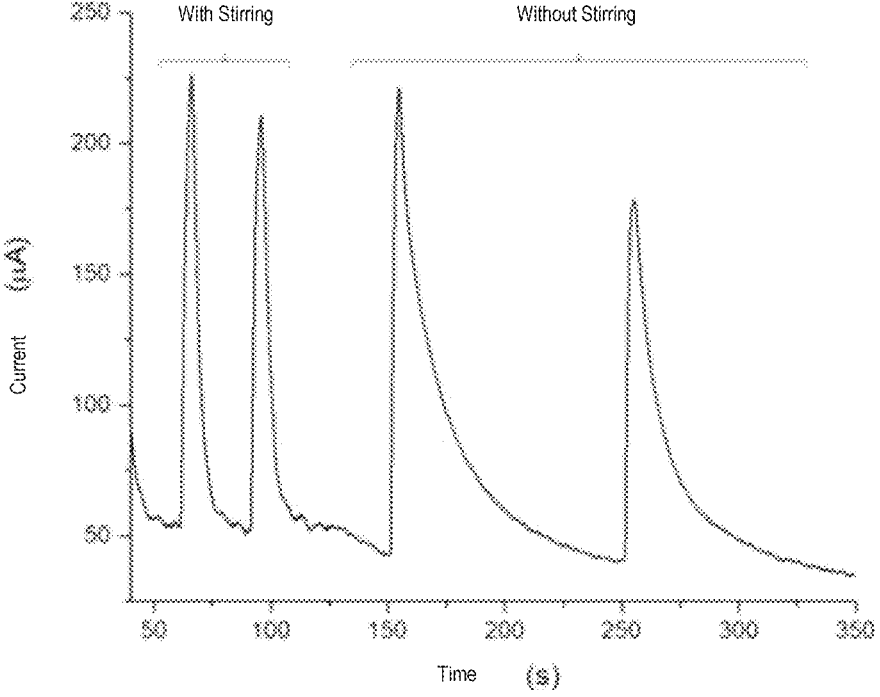
FIG. 4 illustrating the injection in duplicate of 25 mmol/L monoethylene glycol with and without a stirring system, with an applied voltage of 0.55 V and a speed of 20 mV/s.

FIG. 4 shows the current intensity obtained from the injection of the same monoethylene glycol solution in duplicate with and without agitation. The current intensity did not show great variation, which demonstrates the feasibility of the analysis in both modes. On the other hand, the experiment with agitation showed better repeatability with faster analyses. The analysis time without agitation was approximately 100 s, whereas with agitation it was 30 s. Based on these data, it is recommended to carry out the analyzes using a magnetic stirrer.

Example 4: Analysis of Real Sample by Pattern Addition Method

Analyses with a real kerosene sample were performed by the standard addition method. Initially, MEG extraction conditions were optimized. As the sample must be diluted in the supporting electrolyte (preferably 0.5 mol/L NaOH) used in the BIA cell (1), this electrolyte was used as an extracting solvent, since the literature reports that monoethylene glycol is soluble in aqueous solutions. For such, the sample was added in NaOH 0.5 mol/L in the proportion 50% (v/v) causing the system to be stirred.

Figure 5:
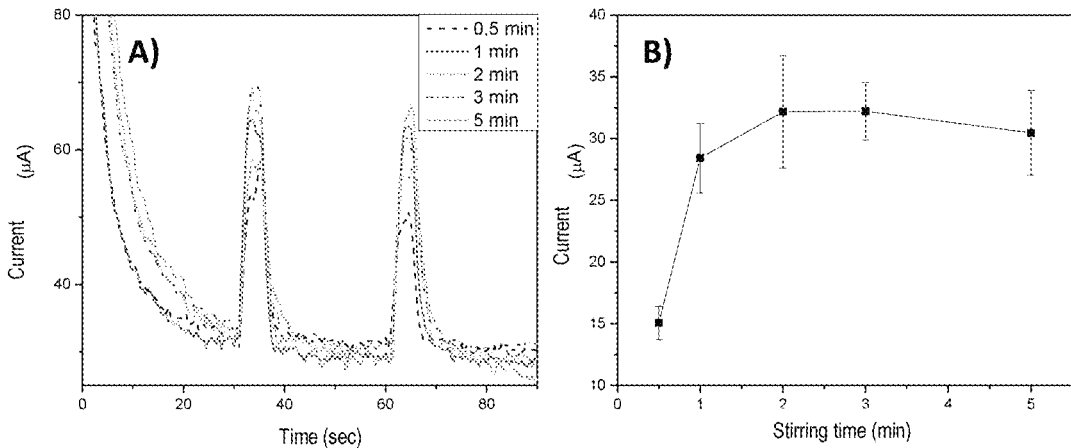
FIG. 5 illustrating BIA-amperograms of real sample subjected to different stirring times (0.5-5 minutes) for MEG extraction, oxidation voltage of 0.55 V and speed of 20 mV/s.

Afterwards, the sample was left to rest for 1 minute, in order to separate the phases. The aqueous phase, comprised of the electrolyte with the MEG that was expected to be extracted, was collected and analyzed. The stirring time for extraction was standardized according to the signal obtained in the electrochemical tests, as shown in FIG. 5. Signals of MEG were observed for values from 0.5 minutes of agitation. After 2 minutes of shaking there was no significant change in signal. Thus, we chose to preferentially use the value of 3 minutes due to its better precision between replicates (SD=3).

Example 5: Extractor Solvent Volume Test

Figure 6:
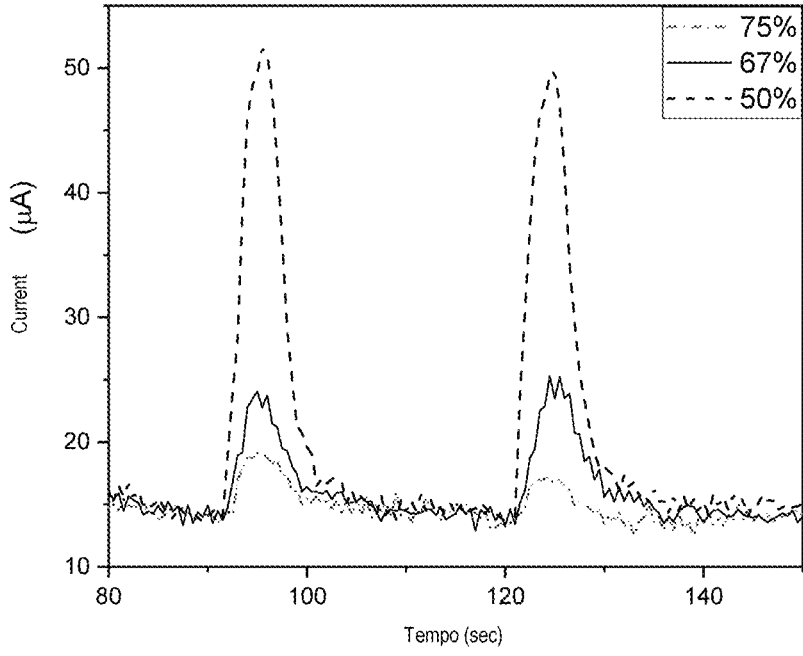
FIG. 6 illustrating BIA-amperograms of a real sample extracted in different proportions of solvent extractor (v/v), with an oxidation potential of 0.55 V and a speed of 20 mV/s.

It is known that the greater the volume of extracting solvent, the greater the amount of analyte to be extracted, but the aqueous phase will be more diluted. Knowing this, the test was carried out in different proportions of extracting solvent in order to find the condition in which the aqueous phase would show a greater analytical response. As noted in FIG. 6, the best results were obtained for an extraction performed with 50% (v/v) of extracting solvent.

Example 6: Interferent Studies

Since the copper electrode is not selective, tests were carried out to observe the oxidation profile of possible interferents in petroleum condensate samples, seeking to improve the accuracy of the method.

Figure 7:
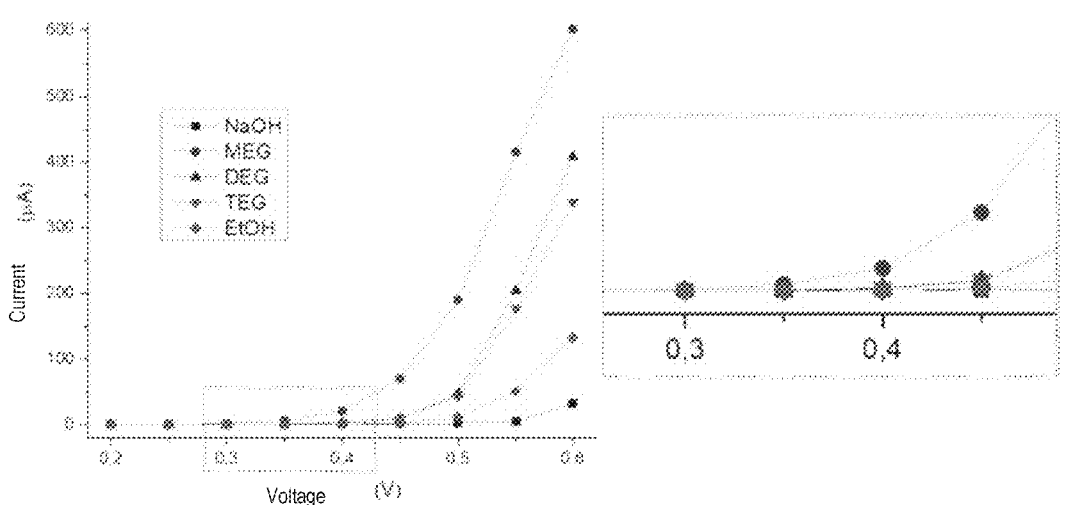
FIG. 7 illustrating the detection potentials for analysis in BIA cell of the present invention aiming at eliminating signals of diethylene glycol (DEG), triethylene glycol (TEG) and ethanol (EtOH) as possible interferents in the quantification of monoethylene glycol (MEG).

It was observed in which voltages the oxidation of other diols similar to MEG (diethylene glycol-DEG and triethylene glycol-TEG) and of ethanol—EtOH occurs. As shown in FIG. 7, it is noted that monoethylene glycol is the first of the compounds to start its oxidation, and up to approximately 0.45 V only it shows changes in current. Later, it was noted the beginning of oxidation of the other glycols, DEG and TEG, but with much lower intensity than MEG. At the voltage used for the previous analyses, 0.55 V, it is observed that even EtOH shows an oxidation signal. Thus, it is concluded that depending on the source of the real sample, in addition to the use of the standard addition method, the use of oxidation voltages close to 0.45 V is of priority to eliminate any sign of possible interferents.

Given the examples, it can be shown that the BIA cell (1) of the present invention presents a robust, practical and portable instrumentation, providing satisfactory results, with better sensitivity compared to traditional amperometric methods.

It can still be stated that portability, together with the low demand for sample volume and minimal waste generation, are strong advantages of using the cell for batch injection analysis (BIA). In addition to these advantages, the results obtained, in terms of analytical performance and selectivity in relation to other diols, and to ethanol demonstrate that present system is superior to traditional amperometric methods It should be noted that, although the present invention has been described with respect to the attached drawings, modifications and adaptations can be made by those skilled in the art, depending on the specific situation, but provided that it is within the inventive scope defined herein.

The invention claimed is:

1. A portable system for determining monoethylene glycol, comprising:

a petrochemical sample comprising the monoethylene glycol;

a potentiostat; and an electrochemical cell by batch injection, wherein the electrochemical cell comprises a polylactic acid as a substrate, wherein said electrochemical cell comprises a working electrode of copper oxide, an auxiliary electrode of stainless steel and an $Ag/AgCl_{sat}$ reference electrode, all immersed in a support electrolyte that is a basic solution, and coupled to an electronic micropipette, with a flow rate of 4 μL/s of the petrochemical sample, and to a magnetic stirring system;

wherein the support electrolyte is 0.5 mol/L NaOH; and wherein a volume ratio of the petrochemical sample and the support electrolyte is 50% (v/v).

2. The portable system according to claim 1, wherein the batch injection electrochemical cell is manufactured from polymeric material.

3. The portable system according to claim 1, wherein the copper oxide working electrode is at a voltage in a range of 0.35 V to 0.55 V.

4. The portable system according to claim 3, wherein the copper oxide working electrode is at the voltage of 0.45 V.

5. The portable system according to claim 1, wherein the working, auxiliary, and reference electrodes are immersed in the support electrolyte under agitation of the stirring system.

6. A portable system for determining monoethylene glycol, comprising:

a petrochemical sample comprising the monoethylene glycol;

a potentiostat; and an electrochemical cell by batch injection, wherein said electrochemical cell comprises a working electrode of copper oxide, an auxiliary electrode of stainless steel and an $Ag/AgCl_{sat}$ reference electrode, all immersed in a support electrolyte that is a basic solution, and coupled to an electronic micropipette, with a flow rate of 4 μL/s of the petrochemical sample, and to a magnetic stirring system;

wherein the electronic micropipette is 2 mm away from the working electrode;

wherein the support electrolyte is 0.5 mol/L NaOH; and wherein a volume ratio of the petrochemical sample and the support electrolyte is 50% (v/v).

* * * * *